United States Patent
Watson et al.

(10) Patent No.: US 12,298,919 B2
(45) Date of Patent: May 13, 2025

(54) BIT LEVEL SHARDING OF SENSITIVE DATA FOR INCREASED SECURITY

(71) Applicant: Dell Products L.P., Round Rock, TX (US)

(72) Inventors: Thomas L. Watson, Richardson, TX (US); Yevgeni Gehtman, Modi'in (IL); Tomer Shachar, Beer-Sheva (IL); Maxim Balin, Gan-Yavne (IL); Arieh Don, Newton, MA (US)

(73) Assignee: Dell Products L.P., Round Rock, TX (US)

(*) Notice: Subject to any disclaimer, the term of this patent is extended or adjusted under 35 U.S.C. 154(b) by 486 days.

(21) Appl. No.: 17/659,743

(22) Filed: Apr. 19, 2022

(65) Prior Publication Data
US 2023/0333993 A1 Oct. 19, 2023

(51) Int. Cl.
| | |
|---|---|
| *G06F 3/06* | (2006.01) |
| *G06F 12/123* | (2016.01) |
| *G06F 12/14* | (2006.01) |
| *G06F 21/60* | (2013.01) |
| *H04L 9/34* | (2006.01) |

(52) U.S. Cl.
CPC .......... *G06F 12/145* (2013.01); *G06F 3/0619* (2013.01); *G06F 3/062* (2013.01); *G06F 12/125* (2013.01); *G06F 21/60* (2013.01); *H04L 9/34* (2013.01); *H04L 2209/04* (2013.01); *H04L 2209/26* (2013.01)

(58) Field of Classification Search
CPC ...... G06F 12/145; G06F 3/0619; G06F 3/062; G06F 12/125; G06F 21/60; H04L 9/34; H04L 2209/04; H04L 2209/26
See application file for complete search history.

(56) References Cited

U.S. PATENT DOCUMENTS

| | | | |
|---|---|---|---|
| 11,347,778 B2 * | 5/2022 | Liu | G06F 16/328 |
| 11,356,120 B1 * | 6/2022 | Markle | G06F 11/1076 |
| 2018/0060037 A1 * | 3/2018 | Johnson | G06F 7/08 |
| 2020/0287711 A1 * | 9/2020 | Araki | G06F 7/501 |
| 2021/0004166 A1 * | 1/2021 | Luo | G06F 3/064 |
| 2022/0286283 A1 * | 9/2022 | Ruffino | H04L 9/0825 |
| 2023/0035929 A1 * | 2/2023 | Ding | G06F 11/1451 |
| 2023/0236755 A1 * | 7/2023 | Kulkarni | G06F 3/067 711/114 |
| 2023/0254370 A1 * | 8/2023 | Ward | H04L 9/50 705/50 |

* cited by examiner

*Primary Examiner* — Saleh Najjar
*Assistant Examiner* — Devin E Almeida
(74) *Attorney, Agent, or Firm* — Workman Nydegger (57) ABSTRACT

Techniques for obfuscating and/or de-obfuscating data using bit-level shard masks are disclosed. Shard masks are generated. The shard masks are designed to shard a block of data into a number of shards for distribution and storage among a number of storage arrays. The shard masks shard the block of data at a bit-level granularity. The shard masks are applied to the block of data to generate the shards. The shards are then distributed among the storage arrays for storage on the storage arrays.

16 Claims, 10 Drawing Sheets

900
(01) Data to be stored:
b402d9b77e60bb71d3ae012b61dc012cf332ddc485a1e4be5277a758062bf7b8030e3a42913e161e42e90
905 a64fb67388885b1a9e195883127d91877511c121af5

(02) shard1mask:
cd5081f0dcfb08afd7050ef5f165a38069bac74085c0ab87701478fdc456a688c31156f87d336a8cb9c65ec5
910 3003561d0aa474272dfcf354d458e373c967af9f (03) shard2mask:
32af7e0f2304f75028faf10a0e9a5c7f964538bf7a3f54788feb87023ba959773ceea90782cc95734639a13a
915 cffca9e2f55b8bd8d2030cab2ba71c8c36a85060

(04) random base for obdata1:
f6937c3dd775ba3230422d2a35cfd568d5345a62f5d78ac1f7f802359c0d394eed256f4ce8b0c5802f07749
920 4d0c65cbd264fdb6d6a2085329d0b5d08500dc888

(05) shard1 obfuscated data:
b603fdbd5f64ba31f346212b65ce5568f536dd62f597a0c6d7fc22581c0bbfce2f243b4491b2870c06c12a54
925 f0c718a824ebab6947883526d91b7f59181a4a95

(06) random base for obdata2:
cd1849d77ee230d51390733e498f448c917f24754fab245fb6e2e1b29aa574fc922277bfac43d105cf9e164
930 c9eaecd5237a5c69f268a45e0f219f756dd681dbc (07) shard2 obfuscated data:
fd1259d77ee2b3d513aa033e419d00ac933a1cc405a1643f3263e7b0822d75b8820e7ebaac0f5416cbaf16
935 64db666c9087b5cdc7b4884163d918f762dd401dfc (08) shard1data retrieved and masked:
840081b05c600821d3040021614401006132c5408580a08650142058040 2a688030012401132020c00c0
940 0a443003100800a0202105883104d018635108120a95

(09) shard2data retrieved and masked:
3002580722000b35000aa010a0098002c92001884002144380263870002295130000e2802800c14124229
0020cb642880851189c090000023090014001400160
945
(10) decoded data retrieved:
b402d9b77e60bb71d3ae012b61dc012cf332ddc485a1e4be5277a758062bf7b8030e3a42913e161e42e90
a64fb67388885b1a9e195883127d91877511c121af5

BIT LEVEL SHARDING OF SENSITIVE DATA FOR INCREASED SECURITY

FIELD OF THE INVENTION

Embodiments of the present invention generally relate to generating and using shard masks. More particularly, at least some embodiments of the invention relate to systems, hardware, software, computer-readable media, and methods for obfuscating and/or de-obfuscating data using bit-level shard masks.

BACKGROUND

A "mask" or a "bitmask" refers to a set of data that can be used to perform various bitwise operations. For example, through the use of a mask, different bits in a set of data can be turned "on" or "off" by performing bitwise operations between that data and the mask. A "bitwise operation" refers to an operation that can be performed on two bit-based patterns having equal lengths. Such operations include, but are not limited to, a logical AND operation and a logical OR operation.

Figure 1:
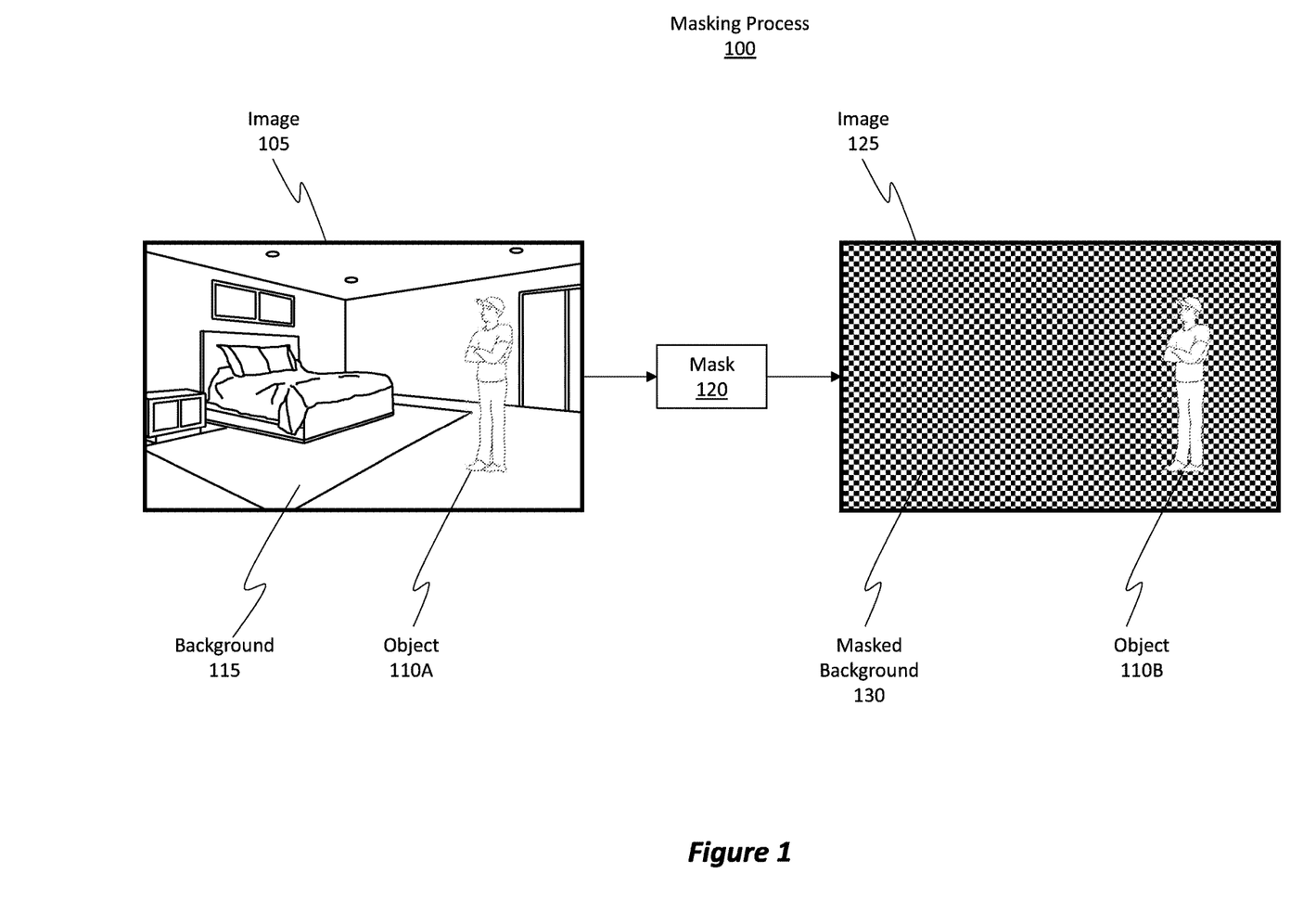
FIG. 1 illustrates an example masking process.

FIG. 1 illustrates an example masking process 100 that can be performed on data (e.g., in this case, the data is image data but any type of data can be used). In FIG. 1, an image 105 is shown as including an object 110A of interest (e.g., a man) and background 115 data. In this example scenario, it is desirable to filter out the background 115. To achieve that objective, a mask 120 can be designed to filter out or "mask" the background 115 so that only the data (i.e. pixels) corresponding to the object 110A remain.

To illustrate, as a result of applying the mask 120 to the image 105, the image 125 is produced, where the image 125 includes pixels for the object 110B, which corresponds to the object 110A. All other pixels have been masked out, as shown by the masked background 130. In this example scenario, the mask 120 was designed to include a logical AND bitwise operator in which bits for only the object 110A were turned "on" while bits for the background 115 were turned "off."

Although the above example was focused on the use of a mask on image data, one will appreciate how a mask can be used to perform bitwise operations on different types of data. The use of masks has been around for a long time. Despite that, there are still many scenarios in which masks can be used to improve various technologies.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 9 illustrates a specific example of obfuscating and de-obfuscating data using bit-level shard masks.

DETAILED DESCRIPTION OF SOME EXAMPLE EMBODIMENTS

Embodiments disclosed herein relate to systems, devices, and methods for obfuscating and/or de-obfuscating data using bit-level shard masks.

Some embodiments determine a number of storage arrays that are available for storing data. Based at least in part on the number of storage arrays, the embodiments generate shard masks. The shard masks are designed to shard a block of data into a number of shards for distribution and storage among the storage arrays. The shard masks shard the block of data at a bit-level granularity. The embodiments also apply the shard masks to the block of data to generate the shards. The embodiments then distribute the shards among the storage arrays for storage on the storage arrays.

During the de-obfuscation process, some embodiments identify a plurality shards that are distributed among a plurality of storage arrays. The embodiments also access a plurality of shard masks. Each shard mask is designed to shard a block of data into a corresponding shard, which is included among the plurality of shards. The plurality of shard masks sharded the block of data at a bit-level granularity. The embodiments generate, or rather recompile, the block of data from the plurality of shards by performing a number of operations. For instance, for each one of the shards, the embodiments identify which specific shard mask corresponds to each shard. The embodiments also perform a binary AND operation on each shard and each shard's corresponding shard mask to generate a set of unmasked shards. The embodiments then perform a binary OR operation on the set of unmasked shards to generate the block of data.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, advantages, and practical applications to the technical field of data protection and integrity. Specifically, the embodiments are designed to provide improved and enhanced techniques for obfuscating and de-obfuscating data in order to protect that data.

There are currently numerous different techniques for encrypting data in order to protect that data. Notably, however, encryption consumes a substantial amount of computing resources and compute cycles. Obfuscation, on the other hand, consumes relatively less compute cycles while offering similar levels of data protection. As a result, the operations and efficiency of the computer system can also be improved as a result of requiring less compute cycles to protect data.

The disclosed embodiments are directed to improved techniques of obfuscation using a bit-level sharding mask. By practicing the disclosed principles, data can now be obfuscated at a highly granular level (e.g., bit-level), thereby enabling that data to be highly protected.

The disclosed embodiments also provide a multi-layered approach to protecting data. That is, not only can the data be obfuscated, but the data can (if so desired) also be encrypted, thereby providing multiple layers of protection.

Furthermore, the embodiments employ a distributed approach to how the data is protected. By obfuscating the data in the disclosed manner and by subsequently distributing not only the obfuscated data but also the tools used to obfuscate that data (e.g., sharding masks), a heightened level of data protection can be achieved. Accordingly, these and numerous other benefits will now be described in detail throughout the remaining portions of this disclosure.

Example Architecture

Figure 2:
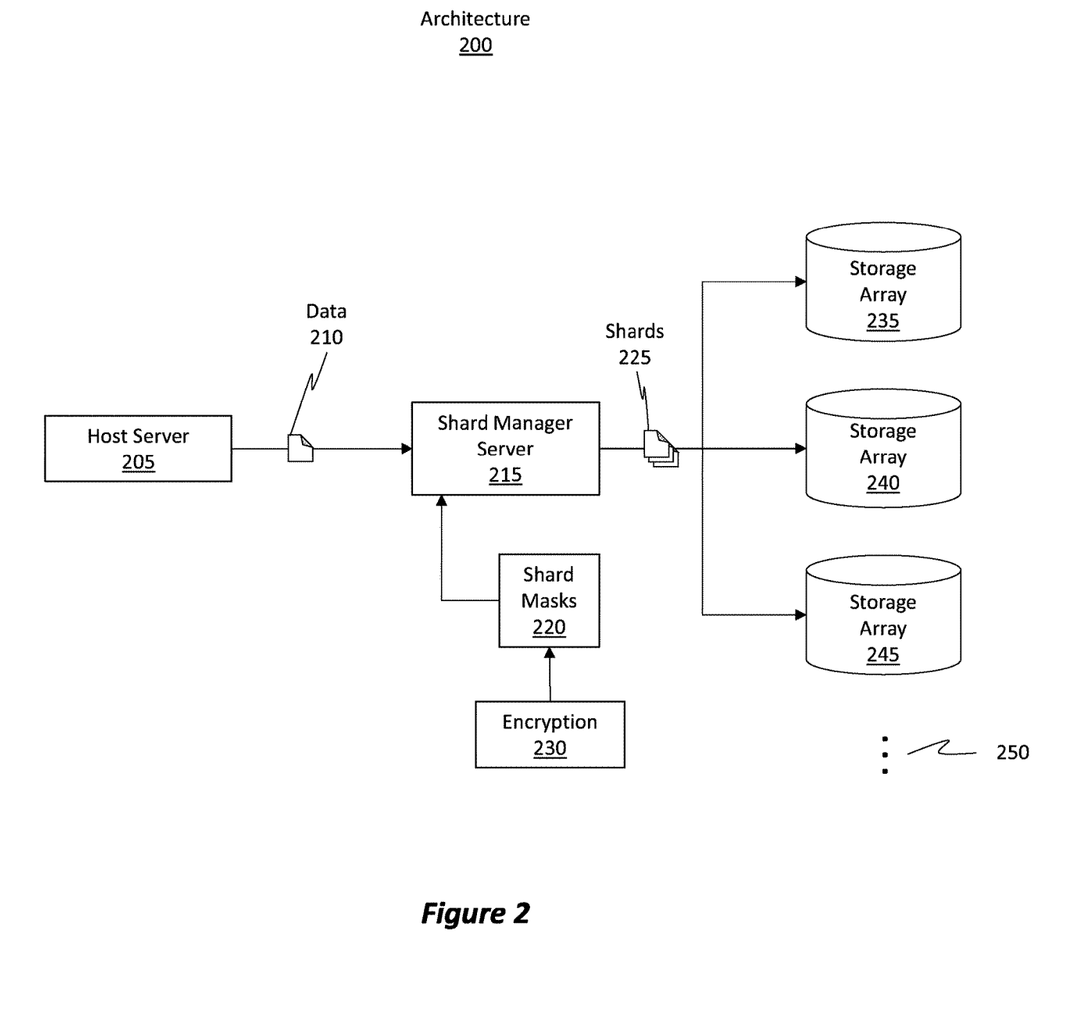
FIG. 2 illustrates an example architecture in which the disclosed principles can be practiced.

Having just described some of the benefits provided by the disclosed embodiments, attention will now be directed to FIG. 2, which illustrates an example architecture 200 in which the principles described herein can be practiced. Architecture 200 is shown as including a host server 205 sending data 210 to a shard manager server 215. Although FIG. 2 shows the shard manager server 215 being a separate server relative to the host server 205, some implementations can configure a single server to perform the operations of those two servers.

The data 210 can be any type of data, without limit. Examples of such data can include, but are certainly not limited to, any type of file data, image data, audio data, video data, and so on. As will be described in more detail later, the embodiments operate on the data 210 at a bit-level granularity. Communications between the various servers and storage arrays can also be protected.

The shard manager server 215 is configured to generate a number of shard masks 220. As used herein, a "shard mask" or "sharding mask" refers to a mask that is used to simultaneously obfuscate the data 210 and to generate multiple shards from the data 210. A "shard" refers to a partition, chunk, or part of an original unit of data. "Sharding" or "to shard" data refers to the process whereby a unit of data is subdivided into multiple discrete shards and to the process of distributing those shards to storage arrays for retention.

Taking a database as an example, the process of sharding a database includes splitting the database into multiple logical subsets of data (e.g., perhaps splitting the database rows or columns) and then distributing the resulting portions (i.e. "shards") across multiple storage arrays.

The shard masks 220 are designed to shard data at a bit-level granularity. Further details on this bit-level granularity aspect will be provided later. In any event, as a result of applying the shard masks 220 to the data 210 (or rather, to blocks that form the data, as will be described in more detail later), the shard manager 215 generates a number of shards 225. As an example, suppose three shard masks were generated. Each shard mask, when applied to a block of data, will generate a corresponding shard. Therefore, as a result of using three shard masks, three shards are generated. Those three shards can then be distributed among various storage arrays. One will appreciate how the number of shard masks can vary. Further, the number of resulting shards is dependent on the number of available shard masks that are generated.

In some example scenarios, after the shard masks 220 were used to generate the shards 225, the shard masks 220 can be encrypted and stored on the shard manager server 215, as shown by encryption 230. That is, after the shard masks 220 are applied to blocks of data, the shard masks 220 can be encrypted and stored in the shard manager server 215. In some cases, the shard masks, after encryption, can be stored elsewhere, such as perhaps any of the storage arrays. Preferably, no shard mask will be stored in the same storage array or location with the corresponding shard that it (the shard mask) created.

The shards 225 are then distributed among different storage arrays, as shown by storage arrays 235, 240, and 245. The ellipsis 250 illustrates how any number of storage arrays can be used.

The shard masks 220 can be designed to achieve different objectives with regard to obfuscating and sharding the data 210. Further details on these objectives will be provided later. By way of a quick introduction, however, the embodiments can design the shard masks 220 to achieve a data redundancy requirement, a data efficiency requirement, or even an enhanced data obfuscation requirement (e.g., by introducing random noise bits into the shards 225).

Figure 3:
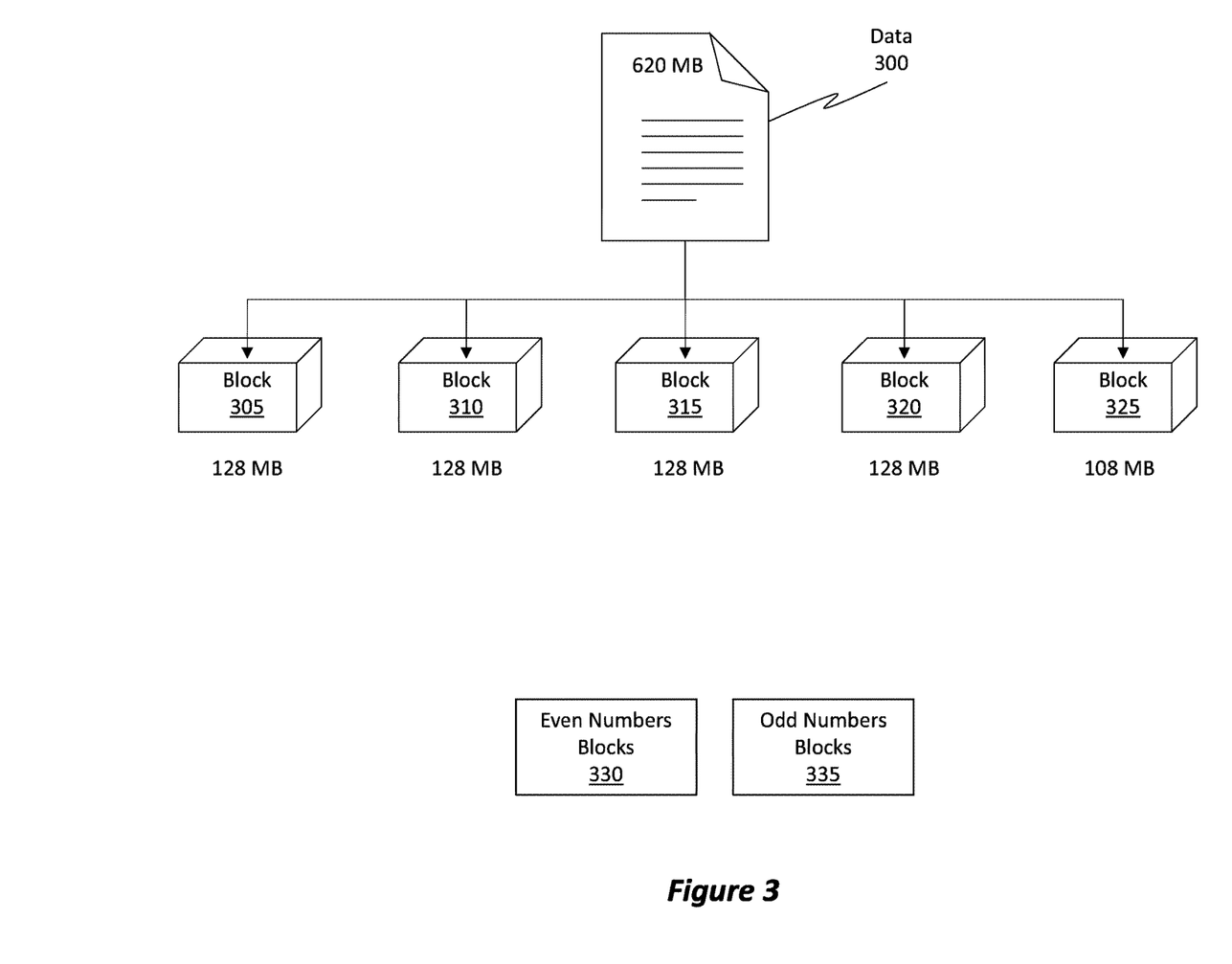
FIG. 3 illustrates how data can be divided into various different blocks.

To achieve the bit-level sharding operations, the embodiments first divide the data 210 into multiple blocks. FIG. 3 provides additional details regarding this aspect.

FIG. 3 shows data 300, which is representative of the data 210 from FIG. 2. The shard manager server 215 from FIG. 2 is able to process the data 300 to generate any number of blocks, as shown by blocks 305, 310, 315, 320, and 325. FIG. 3 shows how the data 300 was originally 620 MB in size. The block 305 is 128 MB in size; the block 310 is 128 MB in size; the block 315 is 128 MB in size; the block 320 is 128 MB in size; and the block 325 is 108 MB size. The combination of the sizes of blocks 305, 310, 315, 320, and 325 equals 620 MB. Notably, the embodiments are able to size the resulting blocks to achieve any size requirement. For instance, the size of a block can be set to 512 bytes, 256 KB, 512 KB, 1024 KB, or any other size, without limit. To be clear, the embodiments can generate and operate on any sized block.

In some scenarios, the blocks can be numbered in a sequential manner. As a result, some blocks will be numbered as even numbered blocks 330. Some blocks will be numbered as odd numbered blocks 335. As will be described later, different sharding masks can be applied to even or odd numbered blocks.

Returning to FIG. 2, the shard manager server 215 is able to divide the data 210 into any number of blocks. The shard manager server 215 is then able to generate the shard masks 220. In some implementations, the same set of shard masks (e.g., one mask for each array) can be used for multiple blocks. Alternatively, multiple sets of shard masks can be used for different blocks. For instance, a set of shard masks can be used for even numbered blocks, and a different set of shard masks can be used for odd numbered blocks. In some cases, a different set of shard masks could even be used for each block. In any event, an arbitrary number of blocks can use the same set of shard masks. The shard manager server 215 can then apply the shard masks 220 to each block of data, thereby generating a number of shards 225 for each block. Those shards 225 can then be distributed among the storage arrays 235, 240, and 245.

Example Methods for Obfuscating Data Using Shard Masks

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
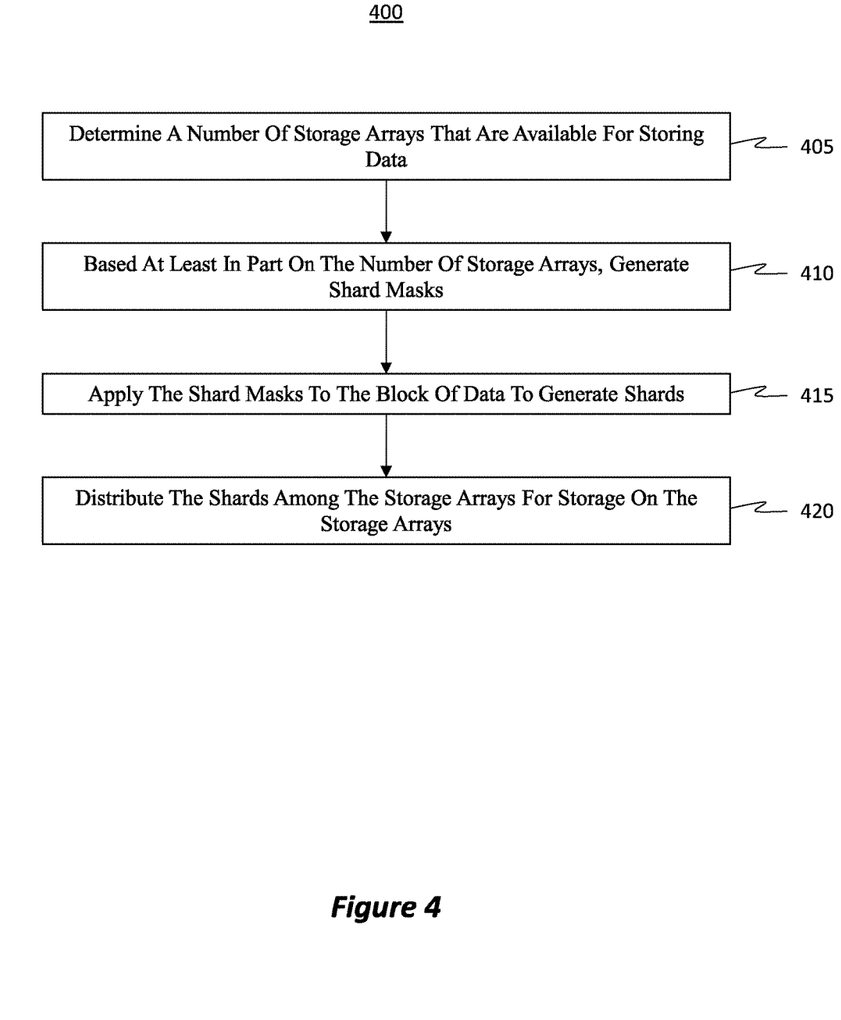
FIG. 4 illustrates a flowchart of an example method for obfuscating data using bit-level sharding masks.
Figure 5:
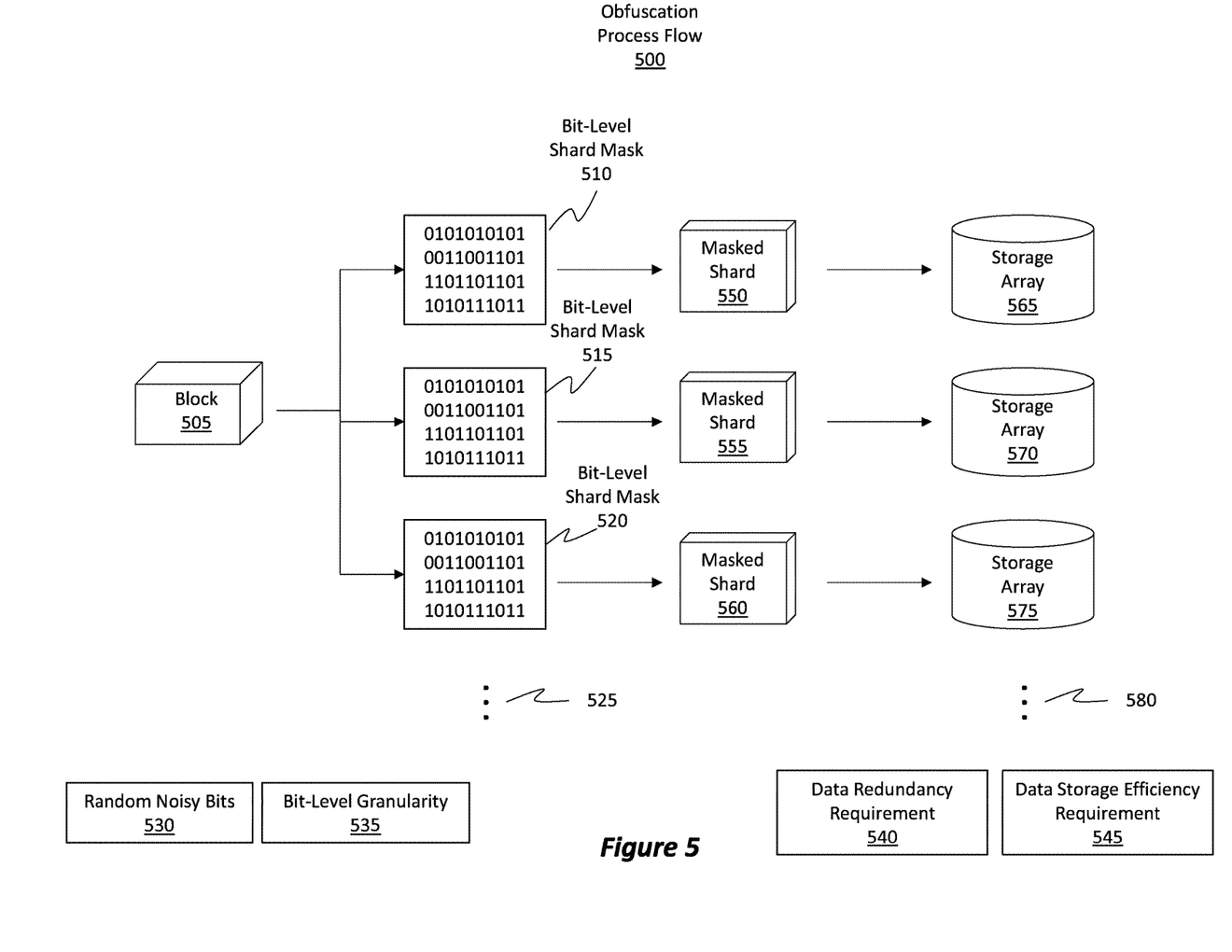
FIG. 5 illustrates an example obfuscation process flow.
Figure 6:
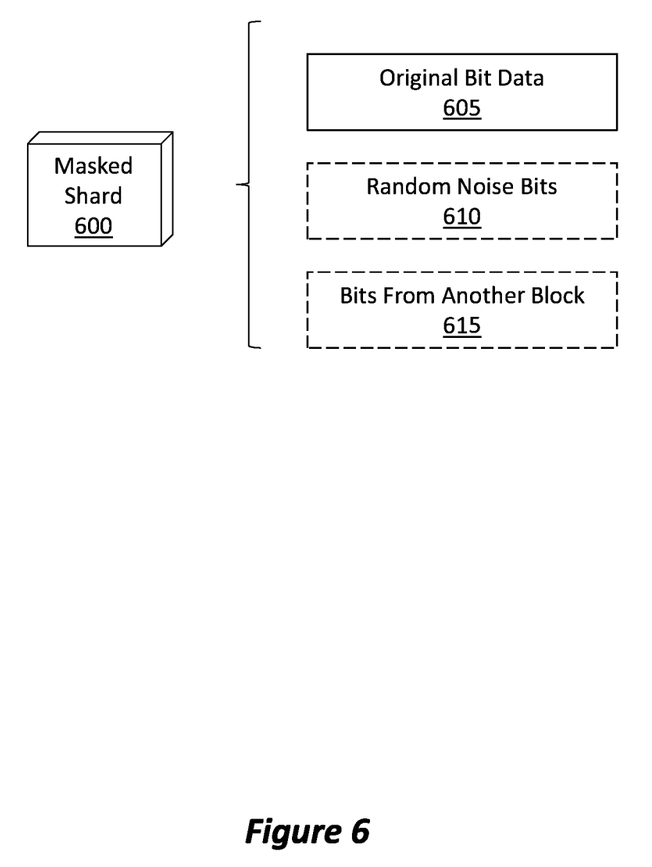
FIG. 6 illustrates the different types of data that can be included in a masked shard.

Attention will now be directed to FIG. 4, which illustrates a flowchart of an example method 400 for obfuscating data using bit-level shard masks. Method 400 can be implemented within the architecture 200 of FIG. 2 and can optionally be implemented by the shard manager server 215. FIGS. 5 and 6 provide additional supporting illustrations that will help supplement what is illustrated in FIG. 4. As such, frequent reference to FIGS. 4, 5, and 6 will be made in this section.

Method 400 includes an act (act 405) of determining a number of storage arrays that are available for storing data. The number of storage arrays will play a part in designing the shard masks. For instance, the number of storage arrays can dictate to what extent shards can be redundantly stored. Furthermore, the number of storage arrays can dictate whether data storage limits should be followed.

Based at least in part on the number of storage arrays, act 410 includes generating shard masks. The shard masks are designed to shard a block of data into a number of shards for distribution and storage among the storage arrays. Each shard mask, when applied to a block of data, will generate a corresponding shard. The combination of all of the resulting shards can be used to recompile the original block of data. Furthermore, the shard masks shard the block of data at a bit-level granularity. The obfuscation process flow 500 of FIG. 5 provides a useful illustration.

FIG. 5 shows a block 505 of data, which is representative of any one of the blocks 305, 310, 315, 320, or 325 from FIG. 3. FIG. 5 also shows a number of bit-level shard masks, such as bit-level shard masks 510, 515, and 520. The ellipsis 525 illustrates how any number of bit-level shard masks can optionally be generated. Each shard mask will be used to generate a corresponding shard.

The bit-level shard masks 510, 515, and 520 are applied to the block 505. Notably, a union of these shard masks will enable all of the original data in the block 505 to be reproduced. That is, a union of the shard masks results in a set of bits all having values of one. Therefore, when the union of the shard mask is applied to a set of bits, no data will be changed and the original data will result. A simplified example will be helpful.

Suppose the block 505 of data included the following bits and values: 011000.

The bit-level shard mask 510 may be designed to "turn on" the first two bits (i.e. the first two from the right) of whatever data it is applied to. By "turn on," it is meant that whatever bit values are included in the first two bits of a unit of data will be passed on (e.g., via a logical AND operation) while the values in other bit positions will be masked.

For instance, based on the above scenario, the bit design of the bit-level shard mask 510 will be the following: 000011. Performing a logical AND operation between this bit-level shard mask 510 and the block 505 will turn on the first and second bits (from the right) and will mask the third, fourth, fifth, and sixth bits (from the right). In this example scenario, applying the bit-level shard mask 510 (000011) to the block 505 (011000) will produce the following result (i.e. shard): 000000.

The bit-level shard mask 515 may be designed to "turn on" the third bit and the fifth bit of whatever data it is applied to. For instance, the bit design of the bit-level shard mask 515 may be the following: 010100. When applied to the block 505 (e.g., by performing a logical AND operation), the following data (i.e. shard) is generated: (011000) AND (010100)=010000.

The bit-level shard mask 520 may be designed to "turn on" the sixth bit and the fourth bit of whatever data it is applied to. For instance, the bit design of the bit-level shard mask 520 may be the following: 101000. When applied to the block 505 (e.g., by performing a logical AND operation), the following data (i.e. shard) is generated: (011000) AND (101000)=001000.

Notice, the union (i.e. a logical OR operation) of the bit-level shard masks 510, 515, and 520 results in the following bit values: 111111. That is, the combination of all of the shard masks allows for the entire original data to be generated. Further, each respective shard masks generates a corresponding shard. Notice, the union of the respective shards produces the original block 505: (000000) OR (010000) OR (001000)=011000.

Thus, each respective shard mask, when applied to a block of data, operates to generate a shard from the block of data. When the shard masks are respectively applied to a block of data, that block of data is divided into shards. Later, the original block of data can be re-generated or recreated from the various shards using an inverse algorithm involving the shard masks, as will be described later.

In some example scenarios, random noisy bits 530 can be injected into the bits of the shards that were "turned off" by the shard mask. Doing so provides an enhanced level of obfuscation and data protection. Further details on this aspect will also be provided later. Accordingly, from the above description, one can appreciate how the embodiments operate on the bits of the block 505 at a bit-level granularity 535.

The bit-level shard masks 510, 515, and 520 can be designed to achieve different purposes or objectives. These objectives include, but are not limited to, a data redundancy requirement 540 and a data storage efficiency requirement 545.

The data redundancy requirement 540 refers to a requirement where copies of the same shard are distributed amongst different storage arrays, thereby promoting redundancy. Therefore, in some implementations, the process of generating the shard masks can be further based on the data redundancy requirement 540 in which the shards are to be redundantly stored among the storage arrays.

The data storage efficiency requirement 545 refers to a requirement or an objective to store data more efficiently. This object can be achieved by interleaving data from other blocks into the unused bits or "off" bits in a masked shard. Thus, a single masked shard can optionally store data from multiple different blocks. Therefore, in some embodiments, the process of generating the shard masks can optionally be further based on the data storage efficiency requirement 545 in which data from multiple different blocks is sharded together, resulting in a single shard that includes data from multiple different blocks.

Returning to FIG. 4, act 415 includes applying the shard masks to the block of data to generate the shards. FIG. 5 also shows how applying the bit-level shard mask 510 to the block 505 generates the masked shard 550; how applying the bit-level shard mask 515 to the block 505 generates the masked shard 555; and how applying the bit-level shard mask 520 to the block 505 generates the masked shard 560. Notably, a size of each mask is equal to a size of the block 505.

Act 420 of FIG. 4 includes distributing the shards among the storage arrays for storage on the storage arrays. FIG. 5 shows how the masked shard 550 is stored on the storage array 565; how the masked shard 555 is stored on the storage array 570; and how the masked shard 560 is stored on the storage array 575. The ellipsis 580 is provided to illustrate how any number of storage arrays may be used to store the shards.

FIG. 6 shows a masked shard 600, which is representative of any of the masked shards 550, 555, or 560 from FIG. 5. In some cases, the masked shard 600 will always include at least some original bit data 605 from the block 505 of FIG. 5. In some other cases, the previous statement may not be a requirement for the algorithm. For instance, it could be the case that the embodiments use a shard having no relevant bits in the outcome. For instance and with reference to the previous example, the bit-level shard mask 510 may have been designed to "turn on" the first two bits of whatever data it is applied to, resulting in the following bit design: 000011. When this shard mask is applied to the data to generate the masked shard 600, the first and second bits will be turned on, such that the first two bits in an original block of data will be included in a shard while other bits will be masked in the shard.

In some cases, the masked shard 600 can include random noise bits 610 that are injected for bits that were "turned off" by the mask shard. Thus, in some implementations, the process of applying the shard masks to a block of data to generate the various shards can include injecting random, noisy bits of data into unused (i.e. turned "off") bit positions included in the shards. Similarly, in some cases, the masked shard 600 can include bits from another block 615 that are injected for bits that were turned off by the mask shard. Another mask can optionally be used to extract those bits.

Example Methods for De-Obfuscating Data Using Shard Masks

Figure 7:
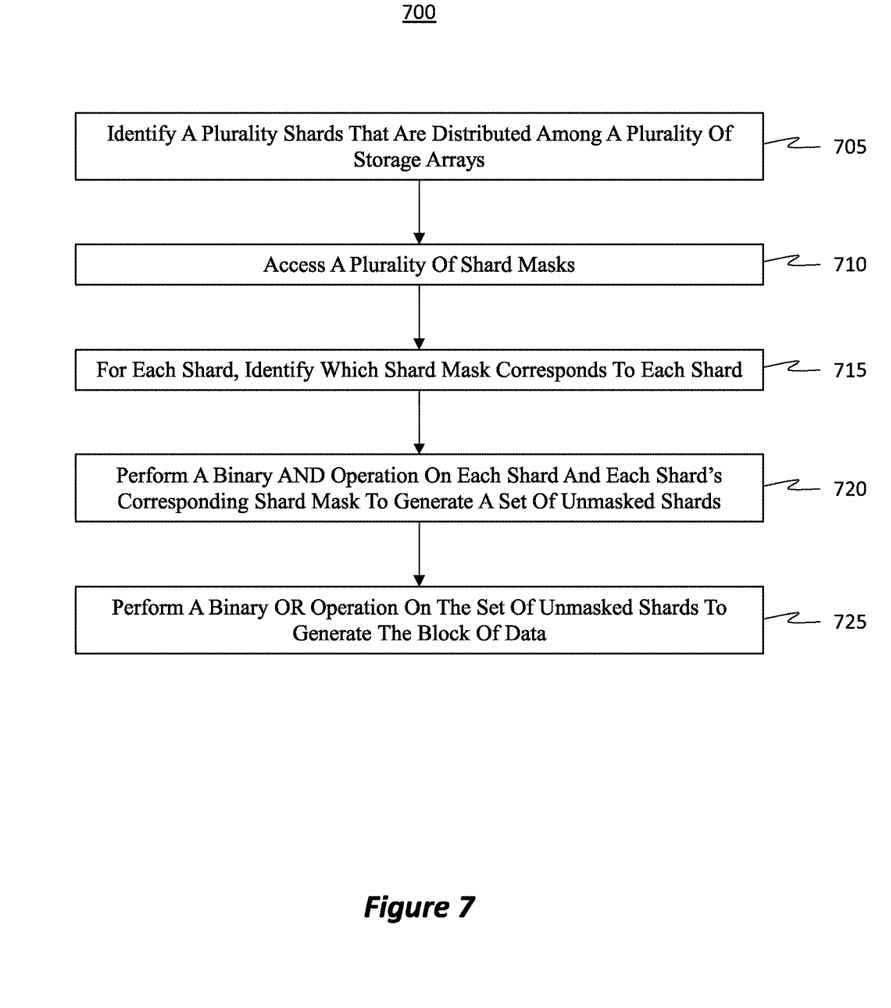
FIG. 7 illustrates a flowchart of an example method for de-obfuscating data using bit-level sharding masks.
Figure 8:
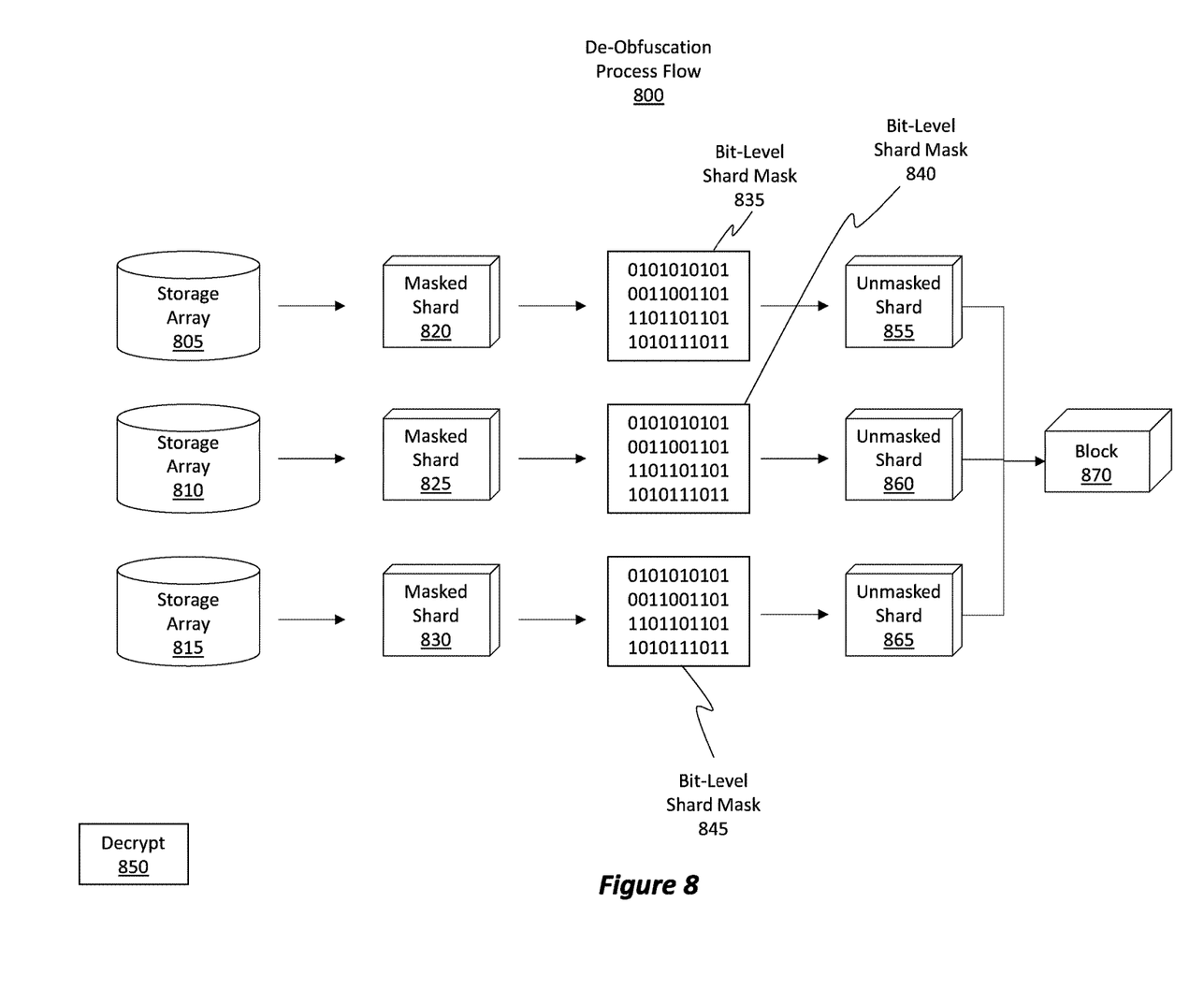
FIG. 8 illustrates an example de-obfuscation process flow.

Attention will now be directed to FIG. 7, which illustrates a flowchart of an example method 700 for de-obfuscating data using bit-level shard masks. Method 700 can also be implemented in the architecture 200 of FIG. 2 and by the shard manager server 215. FIG. 8 is a supporting illustration to FIG. 7, so FIG. 8 will be referenced frequently in this section as well. Notably, method 700 is performed after method 400 is performed.

Method 700 includes an act (act 705) of identifying a plurality shards that are distributed among a plurality of storage arrays. The de-obfuscation process flow 800 of FIG. 8 is illustrative.

FIG. 8 shows a number of storage arrays 805, 810, and 815, which are representative of the storage arrays 565, 570, and 575 from FIG. 5. The embodiments obtain shards from these arrays. For instance, the masked shard 820 is obtained from the storage array 805; the masked shard 825 is obtained from the storage array 810; and the masked shard 830 is obtained from the storage array 815. The masked shard 820 corresponds to the masked shard 550 from FIG. 5; the masked shard 825 corresponds to the masked shard 555; and the masked shard 830 corresponds to the masked shard 560. In some cases, the masked shards that are stored in the storage arrays include duplicate versions of the shards. In some cases, those shards were encrypted, so a decryption process can be performed to decrypt them.

Returning to FIG. 7, act 710 includes accessing a plurality of shard masks. Each shard mask is designed to shard a block of data into a corresponding shard, which is included among the plurality of shards. Further, the plurality of shard masks sharded the block of data at a bit-level granularity, as discussed previously. FIG. 8 shows how the process flow includes accessing the bit-level shard masks 835, 840, and 845. Optionally, these shard masks can be stored and accessed from the shard manager server 215 from FIG. 2. In this manner, the shard masks can optionally be stored separately relative to the storage arrays.

As an alternative, the shard masks could have been stored in the storage arrays. If the shard masks were previously encrypted, then a decryption process, as shown by decrypt 850, can be performed to decrypt those shard masks. Similarly, if the masked shards were encrypted, then those masked shards can be decrypted. Accordingly, in some cases, the process of accessing the plurality of shard masks can include decrypting the shard masks.

Returning to FIG. 7, method 700 includes generating the block of data from the plurality of shards by performing a number of acts. For instance, act 715 includes, for each shard in the plurality of shards, identifying which shard mask in the plurality of shard masks corresponds to each shard. For example, in FIG. 8, the bit-level shard mask 835 was originally used to generate the masked shard 820. Similarly, the bit-level shard mask 840 was originally used to generate the masked shard 825. Therefore, it can be said that the bit-level shard mask 835 corresponds to the masked shard 820 because the bit-level shard mask 835 will be needed in order to de-obfuscate the data included in the masked shard 820.

In FIG. 7, act 720 includes performing a binary AND operation on each shard and each shard's corresponding shard mask to generate a set of unmasked shards. With reference to FIG. 8, the bit-level shard mask 835 is AND'ed with the masked shard 820 to produce the unmasked shard 855. The bit-level shard mask 840 is AND'ed with the masked shard 825 to generate the unmasked shard 860. The bit-level shard mask 845 is AND'ed with the masked shard 830 to generate the unmasked shard 865.

By performing the logical AND operations, the embodiments mask out any data that was previously interjected or interleaved into the shard (e.g., perhaps random noise bits). That is, in some cases, data included in each shard can optionally include data originating from the original block of data as well as random noise data. By performing the AND operation, the random noise data is filtered or masked out. Accordingly, the unmasked shards 855, 860, and 865 constitute a resulting set of unmasked shards.

In FIG. 7, act 725 then includes performing a binary OR operation on the set of unmasked shards to generate the block of data. In FIG. 8, the bit data from the unmasked shard 855 is OR'ed with the bit data from the unmasked shard 860 and is further OR'ed with the bit data from the unmasked shard 865. As a result of performing these OR logical operations, the block 870 is produced, where the block 870 corresponds to the block 505 from FIG. 5.

Example Obfuscating and De-Obfuscating Processes

FIG. 9 provides a specific example of how the embodiments can be used to obfuscate and de-obfuscate data. The scenario presented in FIG. 9 is provided for example purposes only and should not be viewed as being limiting in any manner.

FIG. 9 shows a block of data 900 formatted in hexadecimal formatting. This block of data 900 is representative of the block 505 from FIG. 5.

The embodiments have generated a first shard mask 905, which is also formatted in hexadecimal. A bit-wise complemented version of the first shard mask 905 has also been created, as shown by the second shard mask 910. Therefore, in this example scenario, the generated shard masks include a first shard mask and a second shard mask. Here, the second shard mask is a bit-level complemented version of the first shard mask. Of course, other generation techniques may have been used to generate the shard masks. Furthermore, any number of shard masks may have been generated and not just two.

The embodiments have also generated a first random set of data 915. The first shard mask 905 is applied to the block of data 900. Bits that are turned on by the shard mask 905 are retained and bits that are turned off are interjected with data from the first random set of data 915. The result of the sharding process is the first shard 920 (i.e. obfuscated data). Notably, the size of the first random set of data 915 and the size of the first shard mask 905 is equal to the size of the block of data 900.

The embodiments have generated a second random set of data 925. The second shard mask 910 is applied to the block of data 900. Bits that are turned on by the shard mask 910 are retained and bits that are turned off are interjected with data from the second random set of data 925. The result of this sharding process is the second shard 930 (i.e. obfuscated data). Notably, the size of the second random set of data 925 and the size of the second shard mask 910 is equal to the size of the block of data 900. The shards were then stored in among storage arrays.

Later, the shards are retrieved and the shard masks are used to generate unmasked shards. For instance, the shard mask 905 is used to unmask the first shard 920 to thereby generate the first unmasked shard 935. Similarly, the shard mask 910 is used to unmask the second shard 930 to thereby generate the second unmasked shard 940. The first unmasked shard 935 is then subjected to a logical OR operation with the second unmasked shard 940, thereby producing the decoded data 945. Notice, the decoded data 945 is the same as the block of data 900.

Accordingly, FIG. 9 generally outlines a process for obfuscating and de-obfuscating data using bit-level shard masks. This process includes determining a number of storage arrays that are available for storing data. Based at least in part on the number of storage arrays, shard masks are generated. The shard masks are designed to shard a block of data into a number of shards for distribution and storage among the storage arrays, and the shard masks shard the block of data at a bit-level granularity.

The embodiments apply the shard masks to the block of data to generate the shards. The embodiments also distribute the shards among the storage arrays for storage on the storage arrays.

After the shards have been distributed, the embodiments identify the shards that have been distributed among the storage arrays. The embodiments also access the shard masks.

The embodiments generate the block of data from the shards by performing a number of operations. These operations include, for each shard included in the shards, identifying which shard mask included in the shard masks corresponds to each shard. The operations further include performing a binary AND operation on each shard and each shard's corresponding shard mask to generate a set of unmasked shards. Finally, the operations include performing a binary OR operation on the set of unmasked shards to generate the block of data.

In some cases, the number of shard masks that are generated can equal the number of storage arrays that are available. Alternatively, the number of shard masks that are generated does not equal the number of storage arrays that are available. Notably, each of the shards includes bits that originated from the block of data. In some implementations, the shards can also include bits that are randomly generated noise bits.

In some scenarios, the shard masks include a first set of shard masks and a second set of shard masks. The first set of shard masks can be used for even numbered blocks, and the second set of shard masks can be used for odd numbered shard masks. In the scenario in FIG. 9, it may be the case that the block of data 900 is included among the odd numbered shard masks such that the second set of shard masks are used to shard that block. In some scenarios, multiple blocks of data are available, and the shard masks are applied to each block of data.

By implementing the disclosed principles, the embodiments significantly improve how data is obfuscated and thereby protected. The disclosed obfuscation techniques are implemented at a bit level, thereby providing enhanced levels of protection. Furthermore, the disclosed obfuscation techniques are highly efficient in terms of compute expenditure.

Example Architectures and Computer Systems

The following is a discussion of aspects of example operating environments for various embodiments of the invention. This discussion is not intended to limit the scope of the invention, or the applicability of the embodiments, in any way. One will appreciate how the disclosed operations can be performed using these operating environments.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term "data" or "network packet" is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system or storage array capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information. One will appreciate how any system capable of storing and handling various types of objects could be the backing storage for the disclosed embodiments in lieu of a physical storage array.

As used herein, the term 'backup' is intended to be broad in scope. As such, example backups in connection with which embodiments of the invention may be employed include, but are not limited to, full backups, partial backups, clones, snapshots, and incremental or differential backups.

Figure 10:
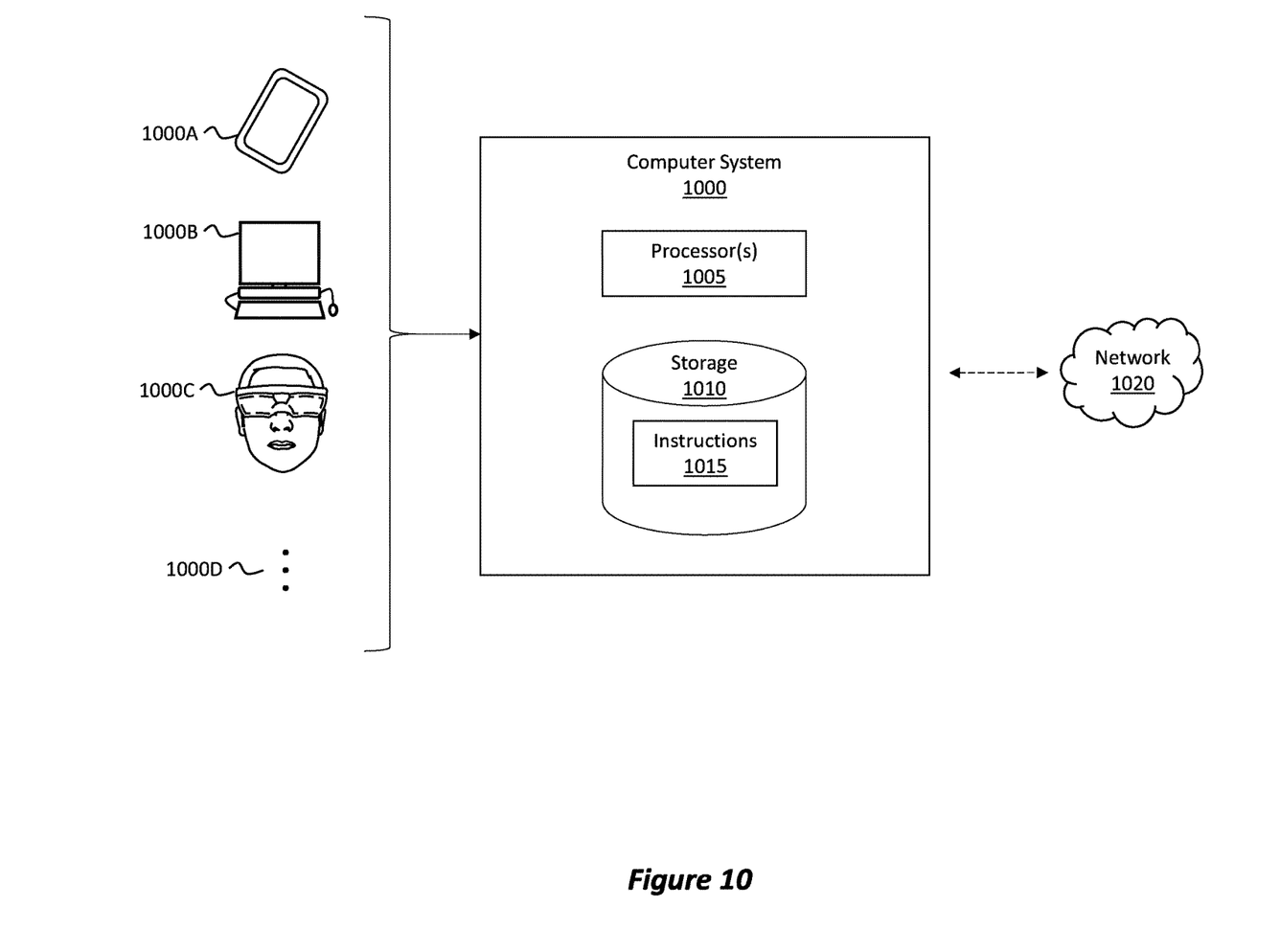
FIG. 10 illustrates an example computer system configured to perform any of the disclosed operations.

With particular attention now to FIG. 10, one example of a computer system 1000 is disclosed. Computer system 1000 may include and/or be used to perform any of the operations described herein, including method 400 of FIG. 4 and method 700 of FIG. 7. Computer system 1000 may take various different forms. For example, computer system 1000 may be embodied as a tablet 1000A, a desktop or a laptop 1000B, a wearable device 1000C, a mobile device, or any other standalone device, as represented by the ellipsis 1000D. Computer system 1000 may also be a distributed system that includes one or more connected computing components/devices that are in communication with computer system 1000.

In its most basic configuration, computer system 1000 includes various different components. FIG. 10 shows that computer system 1000 includes one or more processor(s) 1005 (aka a "hardware processing unit") and storage 1010.

Regarding the processor(s) 1005, it will be appreciated that the functionality described herein can be performed, at least in part, by one or more hardware logic components (e.g., the processor(s) 1005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1000. The different components, modules, engines, and services described herein may be implemented as objects or processors that execute on computer system 1000 (e.g. as separate threads).

Storage 1010 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage 1010 is shown as including executable instructions 1015. The executable instructions 1015 represent instructions that are executable by the processor(s) 1005 of computer system 1000 to perform the disclosed operations, such as those described in the various methods.

The disclosed embodiments may comprise or utilize a special-purpose or general-purpose computer including computer hardware, such as, for example, one or more processors (such as processor(s) 1005) and system memory (such as storage 1010), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors (e.g., one or more remote cameras) or devices via a network 1020. For example, computer system 1000 can communicate with any number devices or cloud services to obtain or process data. In some cases, network 1020 may itself be a cloud network. Furthermore, computer system 1000 may also be connected through one or more wired or wireless networks to remote/separate computer systems(s) that are configured to perform any of the processing described with regard to computer system 1000.

A "network," like network 1020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with the network 1020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for obfuscating data using bit-level shard masks, said method comprising:
   determining a number of storage arrays that are available for storing data;
   based at least in part on the number of storage arrays, generating shard masks, wherein the shard masks are designed to shard a block of data into a number of shards for distribution and storage among the storage arrays, and wherein the shard masks shard the block of data at a bit-level granularity;
   applying the shard masks to the block of data to generate the shards; and
   distributing the shards among the storage arrays for storage on the storage arrays,
   wherein the shard masks include a first shard mask and a second shard mask, and wherein the second shard mask is a bit-level complemented version of the first shard mask.

2. The method of claim 1, wherein generating the shard masks is further based on a data redundancy requirement in which the shards are redundantly stored among the storage arrays.

3. The method of claim 1, wherein generating the shard masks is further based on a data storage efficiency requirement in which data from multiple different blocks, including said block, is sharded together, resulting in a single shard including the data from the multiple different blocks.

4. The method of claim 1, wherein applying the shard masks to the block of data to generate the shards includes injecting random, noisy bits of data into bit positions that have been turned off in the shards by the shard masks.

5. The method of claim 1, wherein, after the shard masks are applied to the block of data, the shard masks are encrypted and stored in a shard manager server.

6. A method for de-obfuscating data using bit-level shard masks, said method comprising:
identifying a plurality shards that are distributed among a plurality of storage arrays;
accessing a plurality of shard masks, wherein each shard mask is designed to shard a block of data into a corresponding shard, which is included among the plurality of shards, and wherein the plurality of shard masks sharded the block of data at a bit-level granularity;
generating the block of data from the plurality of shards by:
for each shard in the plurality of shards, identifying which shard mask in the plurality of shard masks corresponds to said each shard;
performing a binary AND operation on each shard and said each shard's corresponding shard mask to generate a set of unmasked shards; and
performing a binary OR operation on the set of unmasked shards to generate the block of data,
wherein data included within each shard of the plurality of shards includes data originating from the block of data and random noise data.

7. The method of claim 6, wherein accessing the plurality of shard masks includes decrypting the plurality of shard masks.

8. The method of claim 6, wherein a size of each shard mask included in the plurality of shard masks is equal to a size of the block of data.

9. The method of claim 6, wherein the plurality of shards includes duplicate shards.

10. The method of claim 6, wherein the plurality of shard masks are stored separately relative to the plurality of storage arrays.

11. A method for obfuscating and de-obfuscating data using bit-level shard masks, said method comprising:
generating shard masks, wherein the shard masks are designed to shard a block of data into a number of shards for distribution and storage among a number of storage arrays, and wherein the shard masks shard the block of data at a bit-level granularity;
applying the shard masks to the block of data to generate the shards;
distributing the shards among the storage arrays for storage on the storage arrays;
after the shards have been distributed, identifying the shards that have been distributed among the storage arrays;
accessing the shard masks;
generating the block of data from the shards by:
for each shard included in the shards, identifying which shard mask included in the shard masks corresponds to said each shard;
performing a binary AND operation on each shard and said each shard's corresponding shard mask to generate a set of unmasked shards; and
performing a binary OR operation on the set of unmasked shards to generate the block of data,
wherein each shard in said shards includes bits that are randomly generated noise bits, and
wherein each shard in said shards includes bits that are randomly generated noise bits.

12. The method of claim 11, wherein a number of shard masks that are generated equals the number of storage arrays that are available.

13. The method of claim 11, wherein a number of shard masks that are generated does not equal the number of storage arrays that are available.

14. The method of claim 11, wherein the shard masks include a first set of shard masks and a second set of shard masks, wherein the first set of shard masks are used for even numbered blocks, and the second set of shard masks are used for odd numbered shard masks, and wherein said block is included among the odd numbered shard masks such that the second set of shard masks are used to shard the block.

15. The method of claim 11, wherein a union of the shard masks results in a set of bits all having values of one.

16. The method of claim 11, wherein the block of data is one of a plurality of blocks of data, and wherein the shard masks are applied to each block of data included in the plurality of blocks of data.

* * * * *